Patented June 10, 1941

2,245,259

UNITED STATES PATENT OFFICE 2,245,259

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application November 23, 1938, Serial No. 242,025

4 Claims. (Cl. 260—205)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl celluolse, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of my invention have the probable general formula:

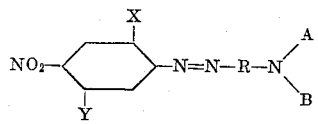

wherein R represents the residue of a benzene nucleus, X represents an alkyl group, an alkoxy group or a halogen atom, Y represents an alkyl group and A and B each represents hydrogen, an alkyl group, an aryl group, a cycloalkyl group, a benzyl radical or a heterocyclic group.

It will be understood that alkyl, as used herein, unless otherwise stated, includes not only unsubstituted alkyl groups, such as a methyl group, an ethyl group or a propyl group, but also substituted alkyl groups such as β-hydroxyethyl, β,γ-hydroxy-propyl, β-methoxyethyl or β-ethoxyethyl, for example. Illustrative of halogen may be mentioned chlorine, bromine, and iodine. Similarly illustrative alkoxy groups include methoxy, ethoxy and propoxy. Illustrative of cycloalkyl may be mentioned cyclohexyl. The benzene nucleus R may be substituted with various monovalent substituents as clearly indicated hereinafter. Said nucleus R should not, however, be substituted with a sulfonic acid group as the presence of such a group largely destroys the affinity of the dye compounds of my invention for organic derivatives of cellulose.

The azo dye compounds of my invention can be prepared by diazotizing an amine having the formula:

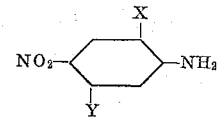

wherein X and Y have the meaning given them and coupling the diazonium compound obtained with a coupling compound having the general formula:

wherein R, A and B have the meaning previously given them. No substituent which would prevent coupling should be present. To illustrate no substituent should be present in the position in which coupling would otherwise take place.

As previously indicated, the nuclear non-sulfonated aromatic azo dye compounds of my invention constitute valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the benzene nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon.

The following examples illustrate the preparation of the azo dye compounds of my invention:

Example 1

16.6 grams of 4-nitro-2,5-dimethylaniline are suspended in 200 cc. of water containing 30 cc. of 36% hydrochloric acid and diazotized at 5–20° C. with 6.9 grams of sodium nitrite. The diazo solution thus prepared is then added with stirring to a cold hydrochloric acid solution of 18.1 grams of di-β-hydroxyethylaniline. Coupling is completed by adding sodium acetate. The dye compound formed is recovered by filtration, washed with water, and dried. The dye compound obtained colors cellulose acetate silk an orange-red shade.

Example 2

19.4 grams of 4-nitro-2-methyl-5-isopropyl-aniline are diazotized as in Example 1 and the diazonium compound obtained is coupled with 16.5 grams of ethyl-β-hydroxyethyl aniline as in Example 1. The dye compound obtained colors cellulose acetate silk an orange-red shade.

Example 3

22.4 grams of 4-nitro-2-methoxy-5-butylaniline are diazotized as in Example 1 and the diazonium compound obtained is added slowly, with stirring, to an iced aqueous solution of 28.0 grams of butyl sodium sulfoethyl-m-toluidine. The reaction is completed by adding sodium acetate and the dye is salted out, filtered and dried. The dye compound obtained colors cellulose acetate silk a red shade.

Example 4

18.7 grams of 4-nitro-2-chloro-5-methylaniline are diazotized as in Example 1.

36 grams of ammonium cyclohexyl-β-sulfatoethyl cresidine are dissolved in cold water and the diazo solution formed above is added slowly with stirring. Concurrently with the addition of the diazo solution there is added a solution of sodium carbonate at such a rate that the solution is just alkaline to litmus. When coupling is complete, the dye is salted out, recovered by filtration, and dried. The dye compound obtained colors cellulose acetate silk a rubine shade.

The following tabulation further illustrates the compounds included within the scope of my invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reaction may, for example, be carried out following the general procedure described in Examples 1 to 4, inclusive.

|   | Amine | Coupling component | Color on cellulose acetate silk |
|---|---|---|---|
| 1 | 4-nitro-2,5-dimethyl aniline | β-Hydroxyethyl-m-toluidine | Orange red to red. |
| 2 | 4-nitro-2,5-diethyl aniline | do | Do. |
| 3 | 4-nitro-2-methyl-5-isopropyl aniline | do | Do. |
| 4 | 4-nitro-2-methyl-5-butyl aniline | do | Do. |
| 5 | 4-nitro-2-methoxy-5-methyl aniline | do | Do. |
| 6 | 4-nitro-2-chloro-5-methyl aniline | do | Do. |
| 7 | 4-nitro-2-bromo-5-methyl aniline | do | Do. |
| 8 | 4-nitro-2-fluoro-5-methyl aniline | do | Do. |
|   | 1–5 above | Glycerolaniline | Orange. |
|   | 6–8 above | do | Red. |
|   | 1–8 above | Ammonium-γ-sulfobutyl cresidine | Red to rubine. |
|   | 1–8 above | Butyl-β-sulfatoethyl aniline ammonium salt | Orange to red. |
|   | 1–8 above | β-Methoxyethyl-m-toluidine | Orange to rubine. |
|   | 1–8 above | β-Hydroxyethyl diphenylamine | Orange to red. |
|   | 1–5 above | β-Hydroxyethyl ethyl aniline | Orange to red. |
|   | 6–8 above | β-Hydroxyethyl ethyl-m-toluidine | Orange to rubine. |
|   | 1–8 above | Ethyl glyceryl cresidine | Red to rubine. |
|   | 1–8 above | Butyl β-sulfoethyl-2,5-dimethoxyaniline | Red to wine. |
|   | 1–8 above | β-Hydroxyethyl β,γ-hydroxypropyl aniline | Orange to red. |
|   | 1–8 above | β-Hydroxyethyl cyclohexyl-m-toluidine | Orange to rubine. |
|   | 1–8 above | β-Hydroxyethyl benzyl aniline | Orange to red. |

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey, U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Letters Patent No. 2,107,898, issued February 8, 1938.

I claim:

1. The azo dye compounds having the general formula:

$$NO_2\text{—}\underset{Y}{\overset{X}{\diamondsuit}}\text{—}N\text{=}N\text{—}R\text{—}N\underset{B}{\overset{A}{\diagup}}$$

wherein R represents the residue of a benzene nucleus, X represents a member selected from the group consisting of an alkyl group, an alkoxy group and a halogen atom, Y represents an alkyl group, A represents a phenyl group, B represents a member selected from the group consisting of hydrogen, an alkyl group, a phenyl group, a cyclohexyl group and a benzyl group and wherein the

group is in para position to the azo bond.

2. An organic derivative of cellulose colored with a nuclear non-sulfonated azo dye compound having the general formula:

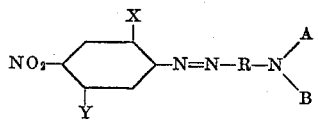

wherein R represents the residue of a benzene nucleus, X represents a member selected from the group consisting of an alkyl group, an alkoxy group and a halogen atom, Y represents an alkyl group, A represents a phenyl group, B represents a member selected from the group consisting of hydrogen, an alkyl group, a phenyl group, a cyclohexyl group and a benzyl group and wherein the

group is in para position to the azo bond.

3. A cellulose acetate colored with a nuclear non-sulfonated azo dye compound having the general formula:

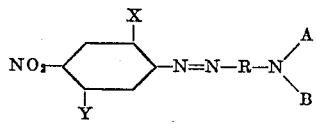

wherein R represents the residue of a benzene nucleus, X represents a member selected from the group consisting of an alkyl group, an alkoxy group and a halogen atom, Y represents an alkyl group, A represents a phenyl group, B represents a member selected from the group consisting of hydrogen, an alkyl group, a phenyl group, a cyclohexyl group and a benzyl group and wherein the

group is in para position to the azo bond.

4. A cellulose acetate colored with a nuclear non-sulfonated azo dye compound having the general formula:

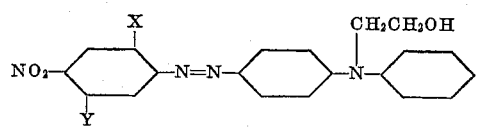

wherein X represents a member selected from the group consisting of an alkyl group, an alkoxy group and a halogen atom and Y represents an alkyl group.

JOSEPH B. DICKEY.